(No Model.)
L. BARTHELMES.
Reaming Saw.
No. 239,698. Patented April 5, 1881.
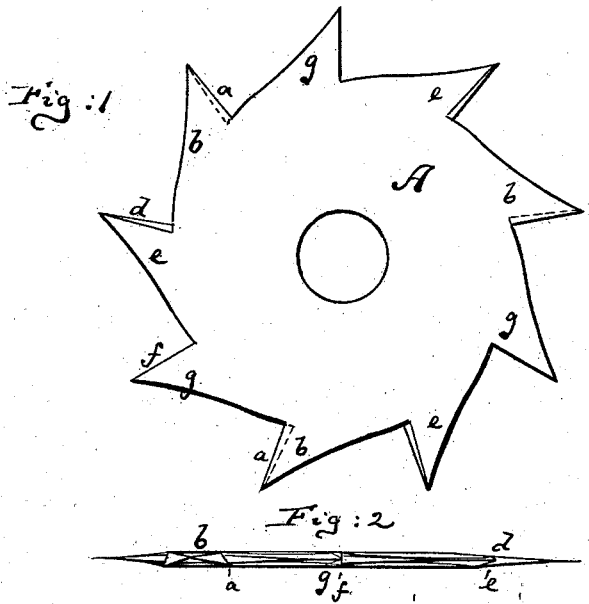
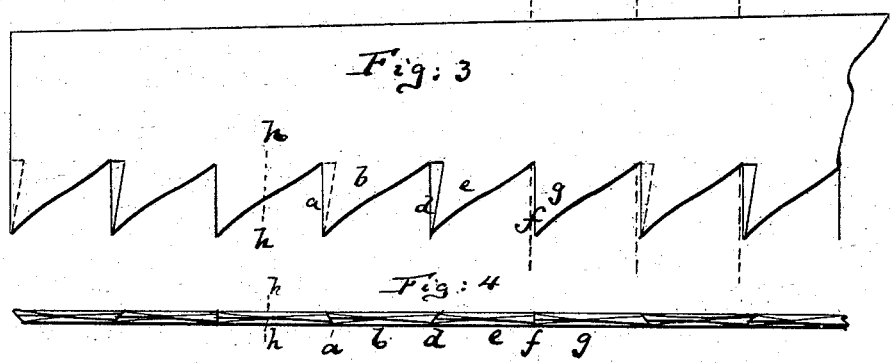
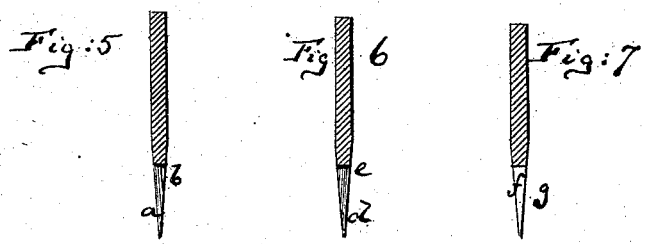
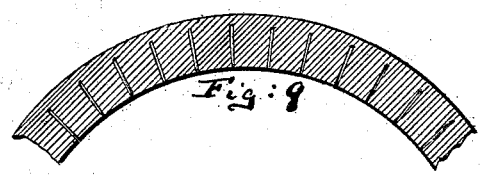
Witnesses:
John C. Tunbridge.
Willy G. E. Schultz.
Inventor:
Ludwig Barthelmes
by his attorney
A. v. Briesen

UNITED STATES PATENT OFFICE.

LUDWIG BARTHELMES, OF ASTORIA, NEW YORK.

REAMING-SAW.

SPECIFICATION forming part of Letters Patent No. 239,698, dated April 5, 1881.

Application filed August 4, 1880. (No model.)

*To all whom it may concern:*

Be it known that I, LUDWIG BARTHELMES, of Astoria, in the county of Queens and State of New York, have invented a new and Improved Reaming-Saw, of which the following is a specification.

Figure 1 is a side view of my improved reaming-saw; Fig. 2, an edge view of the same. Fig. 3 is a side view of the same invention applied to a reciprocating saw; Fig. 4, an edge view thereof. Figs. 5, 6, and 7 are detailed cross-sections of the several kinds of teeth of the saw. Fig. 8 is a section of a strip of wood as reamed out by the saw, and Fig. 9 a section of the same strip when bent.

The object of this invention is to cut triangular grooves out of strips or blocks of wood, so that the same may afterward be bent.

Heretofore ordinary saws have been used for such purposes. They are objectionable, principally, because they ream or cut out rectangular instead of triangular grooves, leaving a flat inner end to the groove, which will practically prevent the proper bending of the wood.

My improved saw is constructed of tapering teeth, placed one behind the other, so that every single tooth of the same saw will travel in precisely the same track as every preceding and following tooth, thereby producing a triangular instead of the ordinary rectangular cut.

Figs. 1 and 2 show the invention applied to a circular saw; Figs. 3 and 4 to a reciprocating saw.

I employ three different kinds of teeth on the same saw, all of which taper outward in equal ratio, as shown in Figs. 5, 6, and 7. The upright or radial cutting-edge *a* of tooth *b* inclines toward one face of the saw. The cutting-edge *d* of the tooth *e* inclines to the opposite face of the saw, and the cutting-edge *f* of the tooth *g* stands at right angles to the face of the saw, so that thus, as the saw A (shown in Fig. 1) is revolved, the tooth *b* will cut along one side of the triangular groove to be produced, the tooth *e* along the opposite side of said triangular groove, and the tooth *g*, with its flat edge, will carry with it the sawdust and clear the groove.

As all the teeth stand in the plane of the saw-blade, and as they are all tapered equally toward the outer points, as shown in Figs. 5, 6, and 7, it follows that the result of the use of the saw will be the production of triangular grooves, such as shown in Fig. 8, thereby enabling the wood so cut to be bent, as shown in Fig. 9. Wood thus reamed is used in the making of piano-forte cases, round-cornered boxes, and the like.

When the invention is applied to a straight saw, as in Figs. 3 and 4, the teeth *b*, *e*, and *g* are arranged in line, one behind the other, but in every other respect like those shown in Fig. 1. In order to facilitate the passage of these teeth through the block of wood, they being all in the same track, I prefer to reduce the thickness of each tooth back of the cutting-edge, so that the part along the line *h h* in each tooth will be thinner than the cutting-edge of the saw-blade, as is indicated in Figs. 2 and 4.

I claim—

A reaming-saw made with tapering teeth *b*, having inclined cutting-edges *a*, with tapering teeth *e*, having oppositely-inclined cutting-edges *d*, and with tapering teeth *g*, having flat edges *f*, all said teeth being placed entirely in line, one behind the other, and tapering toward the points or outer ends in equal degree, for producing a triangular groove, substantially as herein shown and described.

LUDWIG BARTHELMES.

Witnesses:
 WILLY G. E. SCHULTZ,
 WILLIAM H. C. SMITH.